United States Patent [19]

Suzaki et al.

[11] 4,148,567
[45] Apr. 10, 1979

[54] SOUND MOTION PICTURE PROJECTION APPARATUS

[75] Inventors: Kuniyoshi Suzaki, Machida; Akira Ashida, Kanagawa; Takashi Itani, Kandaiji; Tateo Yamada, Kanagawa; Masaya Maeda, Kawasaki; Kiyoshi Takahashi, Kunitachi; Hiroyuki Takimoto, Tokyo, all of Japan

[73] Assignee: Canon Kabushiki Kaisha, Tokyo, Japan

[21] Appl. No.: 818,219

[22] Filed: Jul. 22, 1977

[30] Foreign Application Priority Data

Jul. 27, 1976 [JP] Japan .................................. 51-89491

[51] Int. Cl.² .......................... G03B 31/02; G03B 1/56
[52] U.S. Cl. ...................................... 352/27; 352/14; 352/157; 352/159
[58] Field of Search ................. 352/157, 158, 159, 27, 352/14

[56] References Cited

U.S. PATENT DOCUMENTS

| 3,208,654 | 9/1965 | Gasser ................................. 352/157 |
| 3,743,398 | 7/1973 | Johnson et al. ..................... 352/157 |
| 3,967,886 | 7/1976 | Komine et al. ........................ 352/27 |
| 3,993,404 | 11/1976 | Coomer et al. ...................... 352/157 |

Primary Examiner—Monroe H. Hayes
Attorney, Agent, or Firm—Toren, McGeady and Stanger

[57] ABSTRACT

A sound motion picture projection apparatus provided with pressure pad means operable to press a film against magnetic sound recording and reproducing head means disposed along a path of the film for sound recording and/or reproduction. Urging means urge the pressure pad means toward its film pressing position. Externally operable means are provided for shifting the pressure pad means from its film pressing position to a released position against the urging force of the urging means. Releasable locking means are provided for holding the pressure pad means in the released position against the urging force of the urging means; and film detecting means are disposed in said sound film path behind the magnetic head means to detect introduction of the film into the sound film path and to release the locking of the pressure pad means by the locking means. Thereby, when film introduction into the film path for sound recording and/or reproduction is detected by the film detecting means, the pressure pad means is automatically changed from the released position to the film pressing position.

9 Claims, 10 Drawing Figures

SOUND MOTION PICTURE PROJECTION APPARATUS

BACKGROUND OF THE INVENTION

1. Field of the Invention:

This invention relates to a sound motion picture projection apparatus and more particularly to an improvement in such an apparatus which not only permits the recording and/or reproduction of sound information in synchronism with projected images but also permits automatic film loading of a sound film from an image projecting station into a sound recording and/or reproducing film path, the apparatus being provided with magnetic head means for sound recording and/or reproduction disposed along the said sound film path; and pressure pad means shiftable between a first position in which the pad means presses the film against the magnetic head means and a second position in which the pad means releases the pressing of the film.

2. Description of the Prior Art:

In the conventional sound motion picture projection apparatus of a type permitting automatic film loading, film loading is possible by actuating a continuous film feeding or advancing means such as a sprocket which is disposed along a film path for sound recording and/or reproduction. The sprocket is driven, for example, by a driving motor, together with an intermittent film feeding or advancing mechanism provided in an image projection station. Film loading occurs by shifting an operation knob provided for operation mode selection into a film loading position. After completion of film loading, image projection and synchronous sound reproduction and/or recording is possible by further shifting the operation knob into a projecting position.

In such a motion picture projection apparatus, when the operation knob is in the film loading position, a pressure pad is separated from a magnetic head to permit film loading without hindrance. A capstan which is provided behind the magnetic head along the film path for sound recording and/or reproduction and connected to a fly wheel for making film speed constant, and a pressure roller which is provided for pressing the film against the capstan, are also separated from each other to permit film loading when the operation knob is in the film loading position. When the operation knob is shifted from the film loading position to a projection position, the pressure pad and the pressure roller are brought into pressed contact respectively with the magnetic head and the capstan sandwiching the film therebetween, and then, image projection and sound reproduction or recording are commenced. With such arrangement, an operator of such a projection apparatus must check and confirm that the apparatus has been correctly loaded with the film before starting projection. The operator must devote great care to shifting the operation knob from its film loading position to the projecting position. If such shifting is made when the film has not reached the magnetic head in the film path or has not reached the continuous film feeding or advancing sprocket or under similar inadequate film feeding condition, or if other erroneous operations such as film loading with the operation knob left in the projecting position are made, the film which is fed forward from the image projection station by the intermittent feeding mechanism will be jammed and stopped by the magnetic head and the pressure pad which are already in pressed contact with each other. Such faulty operation not only makes film loading impossible but also tends to break the film.

Therefore, there has been a strong demand for an improvement in this type of sound motion picture projection apparatus to always ensure correct, automatic film loading even when poor operation is made by an operator. The present invention is directed to such improvement.

SUMMARY OF THE INVENTION

It is therefore a principal object of this invention to provide a novel sound motion picture projection apparatus in which it is not necessary to confirm whether or not the film is loaded correctly, and in which correct film loading is automatically ensured irrespective of an erroneous operation even when such an erroneous operation is made by the operator, and further, in which the projection operation is always commenced under a normal condition.

It is another object of this invention to provide, in conjunction with the above stated object, an improved novel arrangement particularly with respect to the pressure pad means provided for pressing the film against the magnetic head means disposed along the sound recording and/or reproduction film path, in which the pressure pad means is securely kept in a position to have the film free from being in pressed contact with the magnetic head means at the time of film loading even when the operator makes an erroneous operation, such erroneous operation never causes the pad means to be brought into pressed contact with the magnetic head means till the film loading is accomplished, and the pressure pad means is automatically shifted to a film pressing position in which it presses the film against the magnetic head means only when the film comes to pass the magnetic head means, so that automatic film loading can be correctly accomplished always without trouble.

To attain these objects, in accordance with this invention, the pressure pad means is arranged so as to press the film against the magnetic head means by the urging force of urging means. Externally operable means are provided for shifting the pressure pad means from the film pressing position to the released position against the urging force of the urging means. Releasable locking means which is capable of locking and retaining the pressure pad means in the released position against the urging force of the urging means is also provided. Film detecting means are disposed behind the magnetic head means in the sound recording and/or reproduction film path for detecting introduction of the film into the film path and, upon detection of the introduction of the film, releases the locking of the pressure pad means by the locking means. Thus, the detecting means serves to automatically change the pressure pad means from the released position to the film pressing position upon detection of introduction of the film into the film path.

It is still another object of this invention to provide a further improved novel arrangement as an additional feature of the above stated sound motion picture projection apparatus, in which the automatic film loading arrangement is further brought to perfection with the arrangement of continuous film feeding means provided along the sound recording and/or reproduction film path and of film guide means provided for guiding the film to the sound recording and/or reproduction film path after it has passed an image projection station.

To attain this object, in accordance with the invention, the novel arrangement of the sound motion picture projection apparatus is further characterized by the following arrangement.

Along the above stated film path and behind the magnetic head means and the pressure pad means, there are provided a capstan which is driven by a driving motor for continuous film feeding or advancing and pressure roller means urged by urging means so as to press the film against the capstan. The pressure roller means is arranged to be shiftable between a film pressing position and a released position by the above stated external operating means. The above stated pressure pad means is arranged in such a relation with the pressure roller means that at the time of film loading, the pressure pad means is retained in its released position by the above stated locking means while the pressure roller means is shifted to its film pressing position through the operation of the externally operable means. In this state, when the above stated film detecting means detects the oncoming film forwarded by the cooperation of the pressure roller means with the capstan, the pressure pad means is automatically changed from its released position to its film pressing position. Further, when the pressure roller means is shifted to its released position through the external operable means, the displacement of the pressure roller means causes the pressure pad means to shift back to its released position.

In another additional arrangement, film guiding means which guides the film into the sound recording and/or reproduction film path after it has passed the image projection station is disposed in front of the film path and is arranged in such a relation with the above stated pressure pad means that, at the time of film loading, the film guiding means is set to its film guiding position when the pressure pad means is set to its released position. When the film detecting means detects the oncoming film being forwarded by the cooperation of the capstan and the pressure roller means and thereby the pressure pad means is automatically changed from the released position to the film pressing position, the film guiding means is shifted from the film guiding position to the released position.

In a particularly preferable embodiment of this invention, there is provided, in front of the sound recording and/or reproduction film path, loop sensing means which is capable of detecting variation in a film loop formed between the above stated sound film path and the image projection station. The loop sensing means is provided with a film guiding surface in such a manner that, when the above stated film guiding means is in the film guiding position, the film guiding means cooperates with the loop sensing means in guiding the film coming from the image projection station to the sound film path. Such an arrangement serves to prevent the loop sensing means from becoming a hindrance to the film loading operation and to ensure a correct and easier operation.

These and other objects, advantages and features of this invention will become clear from the following description of a preferred embodiment thereof when read in connection with the accompanying drawings.

BRIEF DESCRIPTION OF THE DRAWINGS

FIGS. 7A-7D show an improvement of the fixed film guiding frame enabling a more secure film detecting operation particularly of the film detecting means of the present sound motion picture projection apparatus, whereby

DETAILED DESCRIPTION OF THE PREFERRED EMBODIMENT

Figure 1:
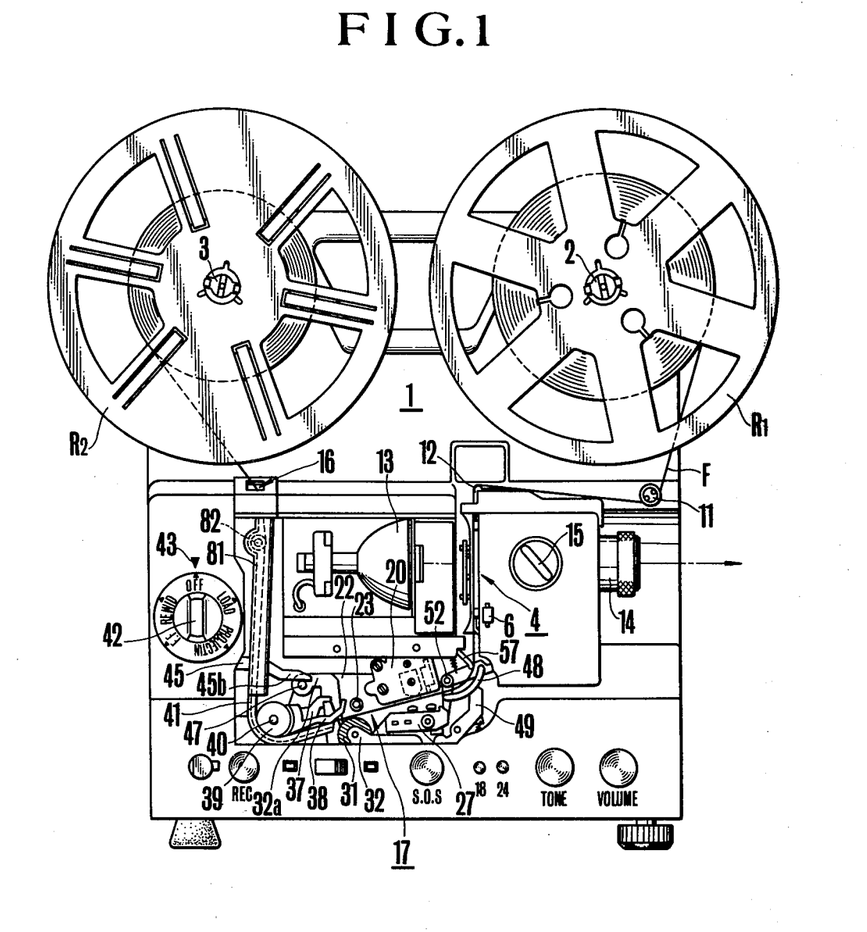
FIG. 1 illustrates a sound motion picture projection apparatus as an embodiment of the present invention showing essential parts relative to the invention.

In the accompanying drawings, reference numeral 1 indicates a sound motion picture projection apparatus arranged in accordance with this invention; 2 indicates a spindle for a film supply reel; and 3 indicates a spindle for a film take-up reel. A film supply reel $R_1$ and a film take-up reel $R_2$ are mounted on these spindles 2 and 3 respectively as shown in FIG. 1.

Reference numeral 4 indicates an image projection station of the above stated projection apparatus 1. As shown in detail in FIGS. 2 through 5, image projection station 4 is provided with an aperture plate 7 which is carried by a fixed base plate 5; a releasable film pressing plate 9 which is caused to press film F against the aperture plate 7 by an urging force of a spring 8; and an intermittent film feeding member 10 having a film feeding claw 10a; the position of which is adjustable up and down by an external operable member 6 (shown in FIG. 1) for framing adjustment. Reference numeral 11 indicates a film guide roller; 12 indicates a film damper which absorbs intermittent impacts brought about on the film F by the intermittent film feeding member 10; 13 indicates a projection lamp; 14 indicates a projection lens; 15 indicates an external operable knob provided for focusing adjustment of the projection lens 14; 16 indicates a film exit port (shown in FIG. 1); and 17 indicates a film path for sound recording and reproduction in the projection apparatus 1.

Along the film path 17, there are arranged one after the other a sound recording/reproducing magnetic head 18 adjustably carried together with a magnetic erasing head 19 in such a manner as to be closely facing the film path 17, on a head holding frame 20 which is secured to a fixed base plate 22 by screws 21. The capstan 23 is disposed to be closely facing the film path 17 and is arranged to serve as a rotary shaft of a fly-wheel 24 which is rotatably supported on the base plate 22 by means of an unillustrated bearing member.

Figure 2:
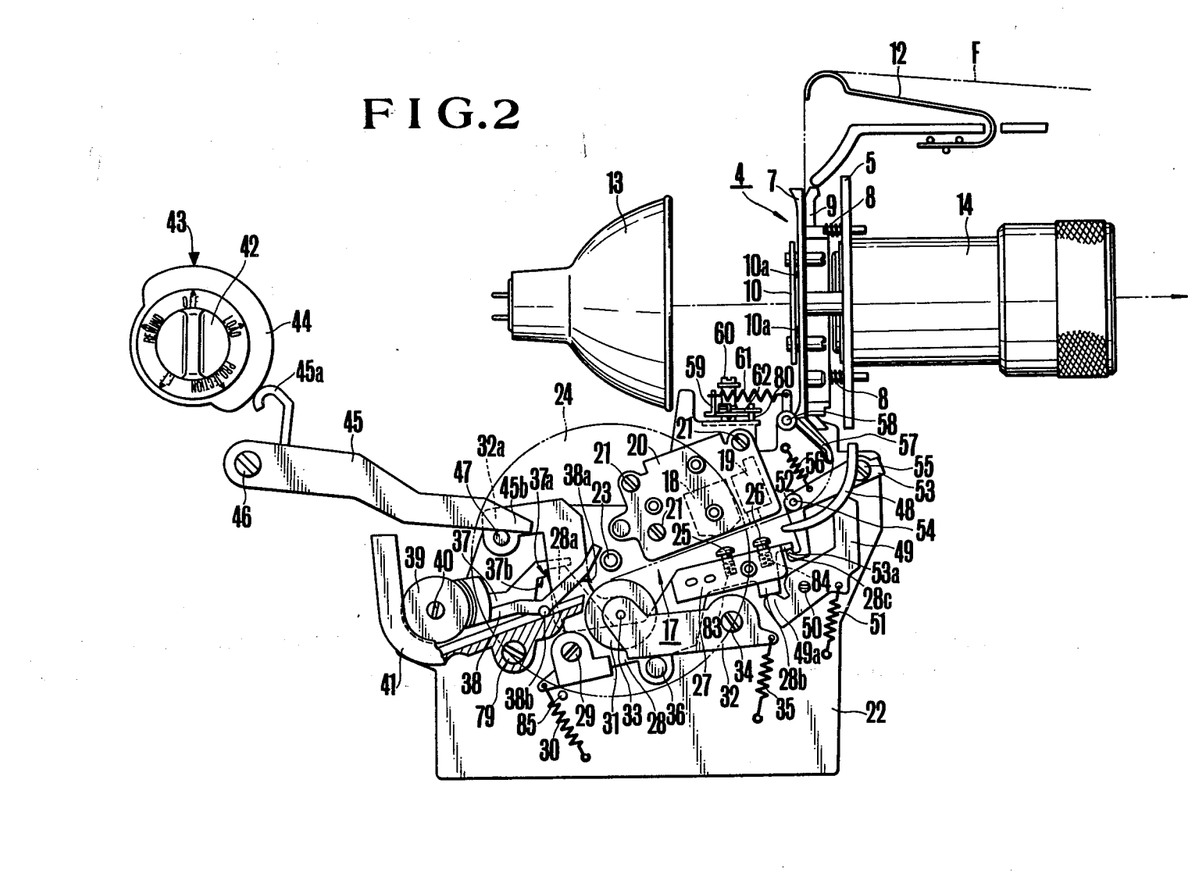
FIG. 2 illustrates such essential parts in a setting state under a stopped condition.
Figure 3:
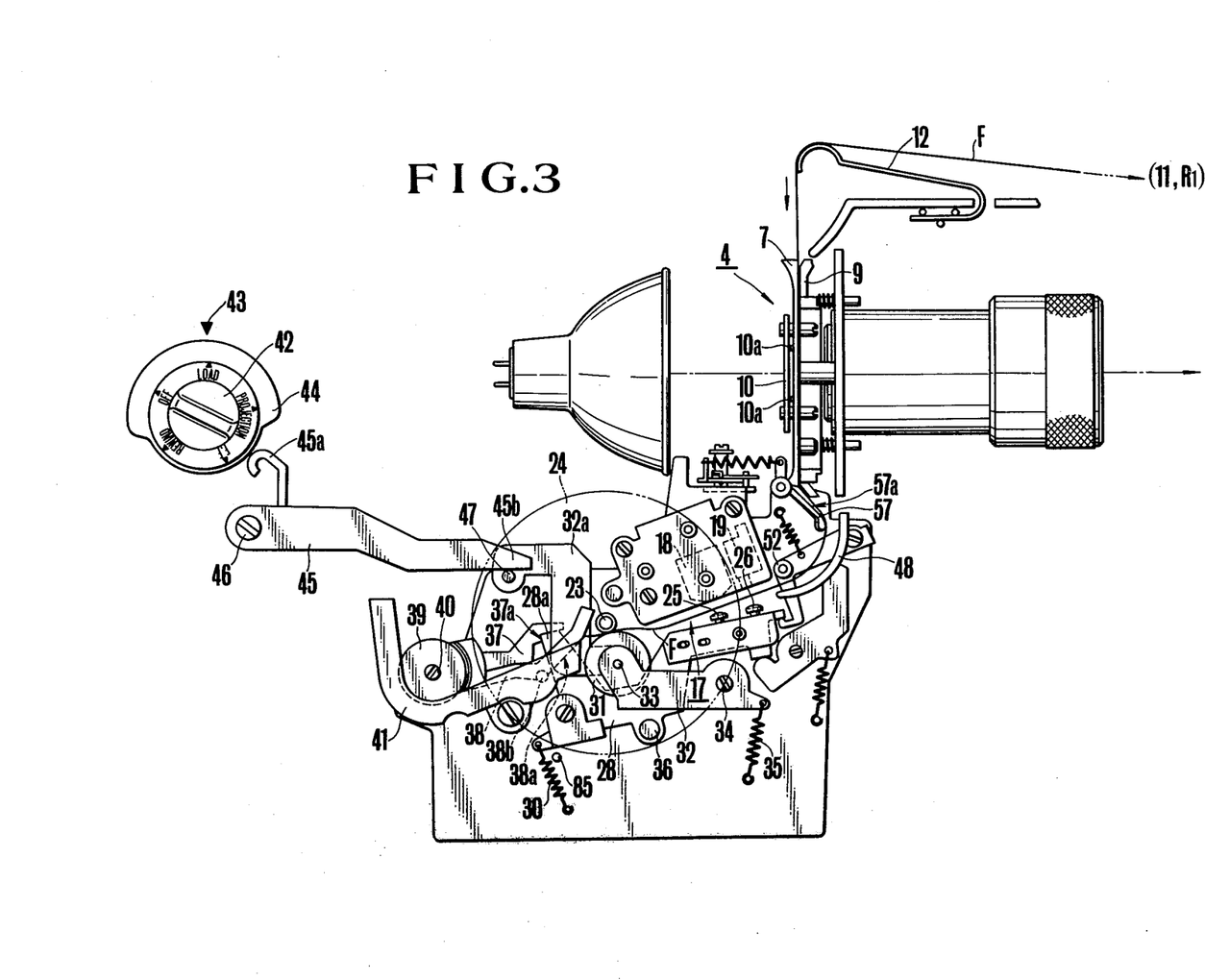
FIG. 3 illustrates such parts in a setting state under a film loading operation.
Figure 4:
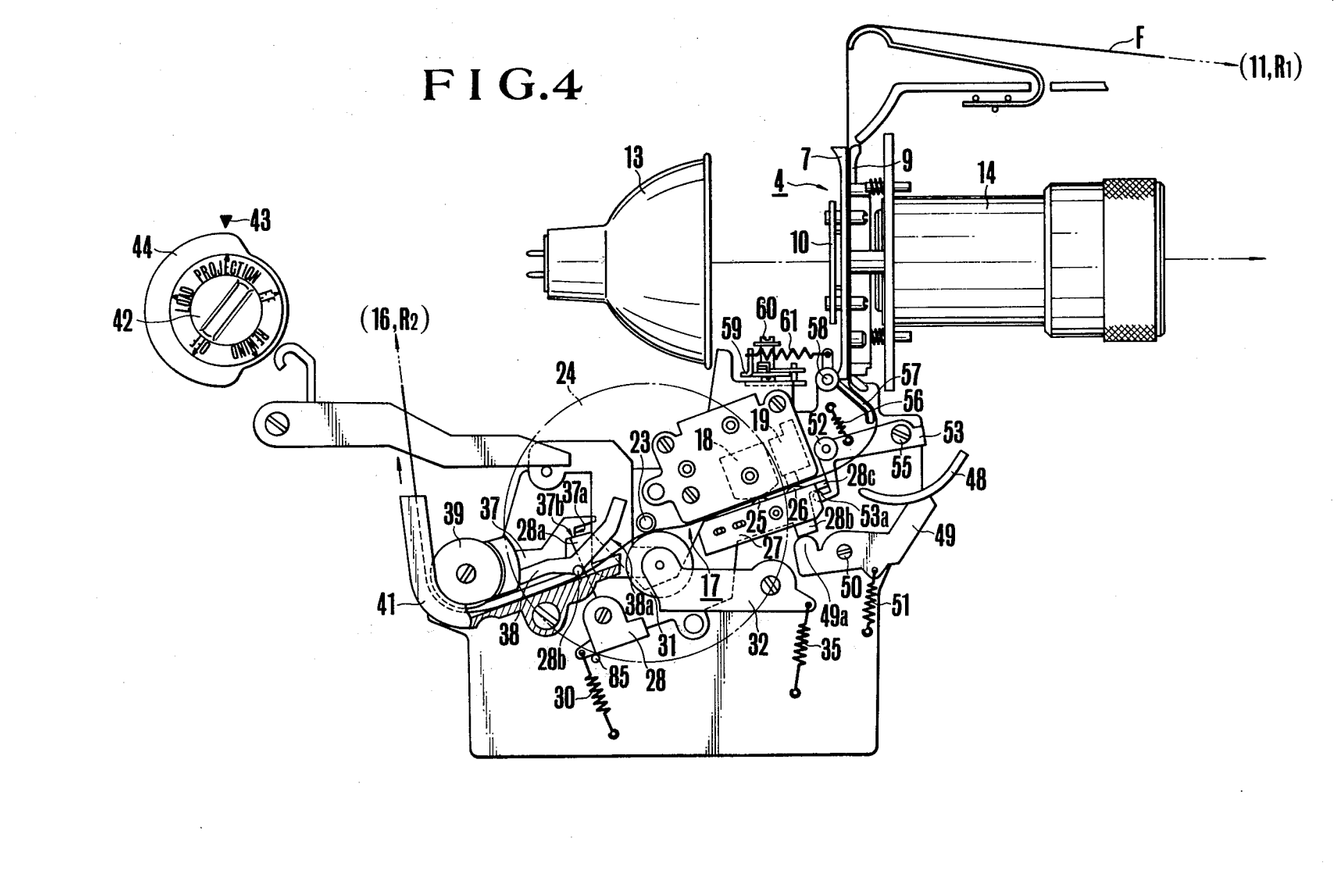
FIG. 4 illustrates such parts in a setting state under a projecting operation.
Figure 5:
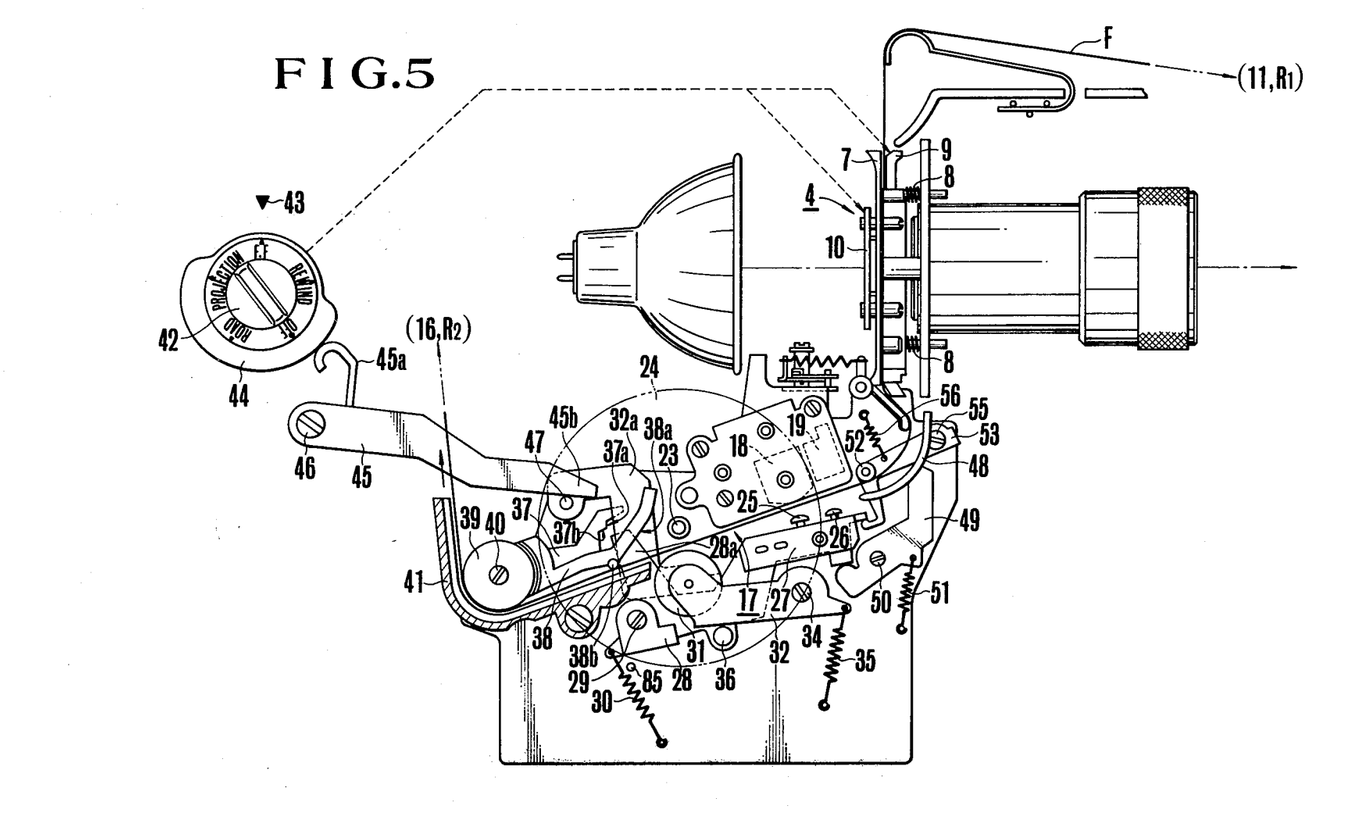
FIG. 5 illustrates such parts in a setting state under a fast film forwarding operation.

Reference numerals 25 and 26 indicate pressure pads which are provided for pressing the film F against the magnetic recording/reproducing head 18 and the magnetic erasing head 19 respectively. These pressure pads 25 and 26 are carried by a pad holding member 27 together with springs 83 and 84, while the member 27 is adjustably mounted on the front end part of a support lever 28 as shown in FIG. 2. The support lever 28 is rotatably supported by a shaft 29 which is provided on the base plate 22 in such a way as to be permitted shifting of these pressure pads 25 and 26 between their respective active positions in which they press the film F against the magnetic heads 18 and 19 as shown in FIG. 4 and their respective inactive positions in which the film F is released from the pressed contact with the magnetic heads 18 and 19 as shown in FIGS. 2, 3 and 5, and is urged by a spring 30 to rotate in a counterclockwise direction around the shaft 29, i.e. in the direction to bring these pressure pads 25 and 26 into their active positions respectively. Reference numeral 85 indicates a stopper pin which defines a stopping position of the pad support lever 28 when it rotates counterclockwise. The pressure pads 25 and 26 are arranged on the base plate 22 in such a manner that the urging forces of the springs 83 and 84 cause them to press the film against the magnetic heads 18 and 19 when the support lever 28 is in contact with the stopper pin 85 and is prevented from further counterclockwise rotation thereby.

Reference numeral 31 indicates a pressure roller which is provided to press the film F against the capstan 23 for continuous film feeding in film loading, sound recording or sound reproduction. The pressure roller 31 is rotatably supported by a shaft 33 which is secured to a pressure roller support frame 32. The support frame 32 is rotatably supported by a shaft 34 which is provided on the base plate 22, in such a manner as to permit shifting of the pressure roller 31 between an active position in which it presses the film F against the capstan 23 at a certain angle to the capstan as shown in FIGS. 3 and 4 and an inactive position in which the film is released from the pressed contact with the capstan 23 as shown in FIGS. 2 and 5, and is urged by a spring 35 to rotate clockwise around the shaft 34, i.e. in the direction to shift the pressure roller 31 toward its active position.

The pressure pad support lever 28 is operatively associated with the above stated pressure roller support frame 32 through a pin 36 provided thereon in such a way as to shift the pads 25 and 26 from their respective active positions to their respective inactive positions by the displacement of the pressure roller support frame 32 when it shifts the pressure roller 31 from its active position to its inactive position.

Reference numeral 37 indicates a releasable locking member. When the pressure pads 25 and 26 have been shifted to their respective inactive positions, this releasable locking member 37 serves to retain the pad support lever 28 in such a condition against the urging force of the above stated spring 30. The releasable locking member 37 has a locking stepped part 37a which is capable of locking the tip of a protrudent arm 28a of the pad support lever 28 and a shoulder part 37b which is capable of coming into butting engagement with the tip of the protrudent arm 28a. Further, the releasable locking member 37 is rotatably supported by a shaft 40 which is provided on the base plate 22 to be coaxially rotatable with a film guide roller 39.

Reference numeral 38 indicates a film detecting member which is disposed in the film path 17 behind the above stated capstan 23 and serves to release the pad supporting lever 28 from the locking position effected by the locking member 37 when it detects the approach of the film F being moved forward by the cooperation of the capstan 23 and the pressure roller 31 during a film loading operation. The film detecting member 38 comprises a slanting face 38a which is capable of contacting with the tip of the film F being moved forward by the capstan 23 and the pressure roller 31 under a condition where the pressure roller has been shifted to its active position; and arced parts 38b which come into sliding contact with both side edges of the surface of the film F, leaving its effective image recorded area intact, during a projecting operation, fast film advancing or a film rewinding operations. Further, the detecting member 38 is either formed into a united body with the locking member 37, for example, by a synthetic resin or the like or arranged side by side together with the locking member 37 and is normally in a state of having descended by its own weight into a film guiding frame 41 which is secured to the base plate 22 by a screw 79 as shown in FIG. 2. In film loading, when the tip of the film F being moved forward by the capstan 23 and the pressure roller 31 comes into contact with the slanting face 38a of the film detecting member 38 as shown in FIG. 3, the film detecting member 38 is rotated thereby counterclockwise around a shaft 40 as shown in FIG. 3. Then, the locking member 37 which is provided together with the film detecting member 38 also rotates in the same manner to release the locking of the pad support lever 28 as shown in FIG. 4.

Reference numeral 42 indicates an operation knob provided for selection of the operation modes of the projection apparatus 1. The operation knob 42 is provided with position indicating marks "OFF" (stop), "LOAD" (film loading), "PROJECTION" (image projection and sound recording and/or reproduction), "F.F." (fast film forwarding) and "REWIND" (film rewinding) for shifting of these operating mode positions in reference to a fixed index mark 43. The operation knob 42 is further provided with a cam 44 which permits control over shifting of the pressure roller 31 between its setting positions in response to shifting one operating mode to another. When the operation knob 42 is set in the position of "LOAD" or "PROJECTION" in reference to the fixed index mark 43, the cam 44 shifts the pressure roller 31 into its active position as shown in FIGS. 3 and 4. Then, with the knob 42 set in "F.F.", "REWIND" or "OFF" position, the cam 44 shifts the roller 31 into its inactive position as shown in FIGS. 2 and 5.

Reference numeral 45 indicates a change-over lever which is rotatably attached to a suitable part of the body of the projection apparatus 1 through a fixed shaft 46, the lever 45 being provided with a cam follower part 45a in relation to the above stated cam 44. The tip portion 45b of the lever 45 is in contact with a pin 47 which is mounted on the protrudent arm 32a of the pressure roller support frame 32. The change-over lever 45 is caused by the above stated cam 44 to rotate clockwise on the shaft 46 when the operation knob 42 is set in the position of "OFF", "F.F." or "REWIND" in reference to the fixed index mark 43. Then, the tip portion 45b of the lever 45 causes the support frame 32 to turn counterclockwise around the shaft 34 through the pin 47 so that the support frame 32 shifts the pressure roller 31 into its inactive position as shown in FIGS. 2 and 5. However, in cases where the operation knob 42 is set in the position of "LOAD" or "PROJECTION" in reference to the fixed index mark 43, the lever 45 is allowed to rotate counterclockwise as the cam 44 is then detached from the cam follower part 45a. Accordingly, the urging force of the spring 35 causes the pressure roller support frame 32 to rotate clockwise around the shaft 34 while the changeover lever 45 is also caused by this to rotate counterclockwise around the shaft 46 and thereby the pressure roller 31 is shifted into its active position as shown in FIGS. 3 and 4.

Reference numeral 48 indicates a film guiding member disposed in the fore part of the film path 17 to guide the film F which is being moved forward from the image projection station 4 by the intermittent film feeding member 10 into the film path 17. The film guiding member 48 is supported by a support lever 49 which, in response to the shifting of the pressure pads 25 and 26, serves to set the guiding member 48 to its inactive position (a position in which it is released from its film guiding function as shown in FIG. 4) when the pressure pads 25 and 26 are in their respective active positions and to set the guiding member 48 to its active position (a position in which it guides the film F as shown in FIGS. 2, 3 and 5) when these pressure pads 25 and 26 are in their inactive position. To carry out such shifting, the support lever 49 is provided with a protrusion 49a which is engageable with the protrusion 28b of the pressure pad supporting lever 28, and is rotatably supported by a shaft 50 carried on the base plate 22, and further, is urged by a spring 51 so as to be kept in an operative relation to the pad supporting lever 28. Reference numeral 52 indicates a film guide roller disposed in front of the magnetic heads 18 and 19 to define the travelling path of the film F in such a manner as to prevent it from touching with the magnetic heads 18 and 19 when the projection apparatus 1 is under a fast film forwarding or film rewinding operation. The film guide roller 52 is rotatably supported by a shaft 54 which is secured to a support lever 53. The support lever 53 serves to set the film guide roller 52 to an inactive position (a position in which the travelling path of the film F is not defined as shown in FIG. 4) when the pressure pads 25 and 26 are in their respective active positions and to set the roller 52 to its active position (a position in which it defines the film travelling path as shown in FIGS. 2, 3 and 5) where the pressure pads 25 and 26 are in their respective inactive positions. To carry out such shifting of the guide roller 52, the support lever 53 is provided with a protrusion 53a which is engageable with the protrusion 28c of the pad support lever 28, and is rotatably supported by a shaft 55 carried on the base plate 22, and further, is urged by a spring 56 to be kept in an operative relation to the pad support lever 28.

Reference numeral 57 indicates a loop sensor disposed immediately behind the image projection station 4 to detect variation in a film loop formed between the film path 17 and the image projection station 4. The loop sensor 57 is provided with a film guiding surface 57a to guide the oncoming film F being moved forward by the intermittent film feeding member 10 toward the above stated film guiding member 48, and is rotatably supported by a shaft 58 which is carried on the base plate 22.

Reference numeral 59 indicates a projection speed control member which responds to the loop sensor 57 to control the projection speed of the projection apparatus 1, i.e. a film feeding speed of the intermittent film feeding member 10, in such a manner as to maintain the film loop at a predetermined amount.

Figure 6:
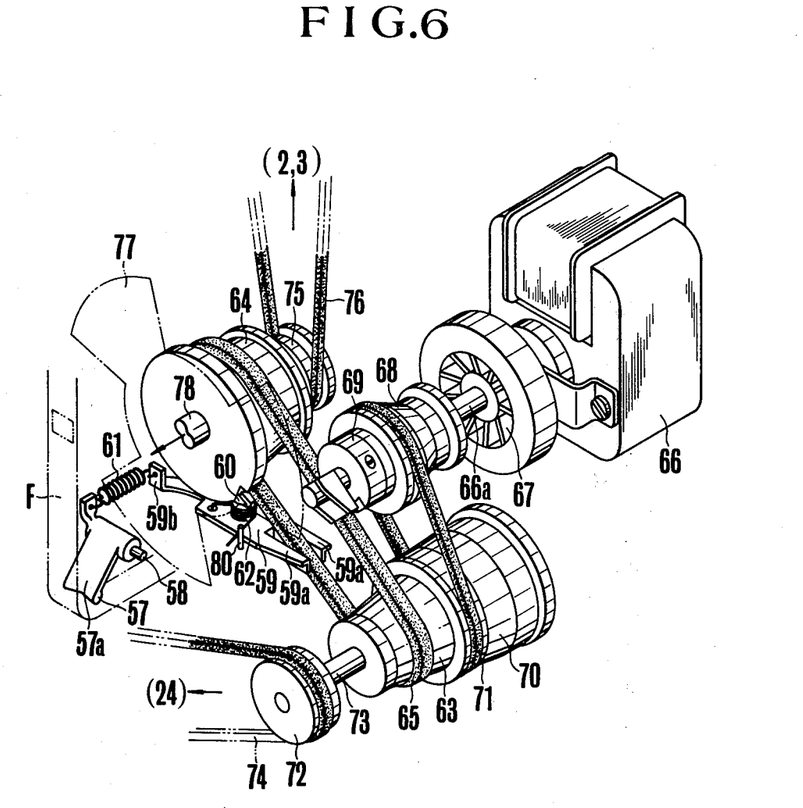
FIG. 6 is a perspective view illustrating the mode of film feeding speed control at the projection station by means of loop sensing means in the present sound motion picture projection apparatus.

As illustrated in FIG. 6, the projection speed control member 59 is provided with a forked part 59a which interposes therein a belt 65 strained between cone pulleys 63 and 64 which form a non-stepped speed change gear for a projection system (intermittent film feeding device) and is rotatably supported by a shaft 60 carried on the base plate 22 as shown in FIG. 6. Further, the projection speed control member 59 is connected through a spring 61 at its rear end 59b to the loop sensor 57 to change, in response to the loop sensor 57, the circumferential contacting points of the belt 65 on the cone pulleys 63 and 64 in such a manner as to keep the film loop at a predetermined amount by adjusting the projection speed thereby. The connecting spring 61 serves to absorb fractional intermittent movement of the loop sensor 57 which takes place in response to the intermittent movement of the film F caused by the intermittent film feeding member 10 and to ensure that only a displacement of the loop sensor 57 that is corresponding purely to a change in the film loop is transmitted to the projection speed control member 59.

Reference numeral 62 indicates a spring which urges the projection speed control member 59 and accordingly the loop sensor 57 back to their respective original positions in which a pin 80 prevents the speed control member 59 from further rotating as shown in FIG. 6.

Referring to FIG. 6, reference numeral 66 indicates a motor which is provided as the driving source of the projection apparatus 1; 67 indicates a motor cooling fan which is secured to an output shaft 66a of the motor 66; 68 indicates a pulley on the driving side connected to the output shaft 66a of the motor 66 through a centrifugal clutch 69; 70 indicates an intermediate pulley arranged into one united body with the above stated cone pulley 63. The intermediate pulley 70 is connected through a belt 71 to the driving side pulley 68 on the driving side. These pulleys 68 and 70 are provided with stepped parts for changing of the projection speed, for example, between 18 frames/sec. and 24 frames/sec. Reference 72 indicates a pulley provided for driving a fly wheel and secured to a rotating shaft 73 of the pulleys 63 and 70. The pulley 72 is connected to the fly wheel through a belt 74. Reference numeral 75 indicates a pulley which is arranged into one united body with the cone pulley 64 for driving the reels and is connected to the reel spindles 2 and 3 through a belt 76. Reference numeral 77 indicates a shutter blade which is secured to the rotating shaft 78 of the pulleys 64 and 75. Although not illustrated in the drawing, the rotating shaft 78 is connected to a known cam mechanism which is provided for the purpose of driving the intermittent film feeding member 10.

Further, in FIG. 1, reference numeral 81 indicates a fixed film guide duct which is aligned with the fixed film guiding frame 41; 82 indicates a film guide roller which is rotatably disposed at a suitable part inside the film guide duct 81. After passing the film guiding frame 41, the film F is guided by the film guide duct 81 and the film guide roller 82 and is moved forward to the film take-up reel R2 through the exit port 16.

The operation of the sound motion picture projection apparatus 1 which is arranged as described in the foregoing in each mode of operation will be understood from the following description: When the mode selecting operation knob 42 is set in the "OFF" position, the pressure roller support frame 32 is rotated counterclockwise against the force of the spring 35 by the change-over lever 45 through the pin 47, because the changeover lever 45 has been rotated clockwise by the cam 44 of the operation knob 42. Accordingly, the pressure roller 31 is held in its inactive position and stays away from the capstan 23. Meanwhile, the pressure pad support lever 28 has been rotated clockwise against the urging force of the spring 30 by the pressure roller support frame 32 through the pin 36 and is held in that position. The pressure pads 25 and 26 are, therefore, set and kept in their inactive positions away from the magnetic heads 18 and 19 respectively. Further, by this, the film guide member 48 and film guide roller 52 are set and held in their active positions respectively. Under this condition, the film detecting member 38 is in a state of having fallen into the film guide frame 41 and, accordingly, the locking member 37 is set in its position of having been engaged with the protrudent arm 28a of the pressure pad support lever 28.

When the operation knob 42 is shifted to its "LOAD" position for loading the apparatus 1 with the film F under such a condition, the cam 44 is detached from the cam follower part 45a of the change-over lever 45 thus enabling the change-over lever 45 to rotate counterclockwise. Therefore, as shown in FIG. 3, the urging force of the spring 35 causes the pressure roller support frame 32 to rotate clockwise while thereby causing the change-over lever 45 to rotate counterclockwise. By this, the pressure roller 31 is set in its active position and is in pressed contact with the capstan 23.

On the other hand, under such a condition, the pad support lever 28 comes to be engaged with the locking stepped part 37a of the locking member 37 at the tip of its protrudent arm 28a, thereby retained in said position. Accordingly, irrespective of the displacement of the pressure roller support frame 32, the pressure pads 25 and 26, the film guide member 48 and the film guide roller 52 are retained by the locking means 37 in their states as shown in FIG. 2 respectively.

When the operation knob 42 is shifted to the "LOAD" position, an unillustrated clutch mechanism connected to the reel spindle 3 for the film take-up reel $R_2$ is actuated to connect the reel spindle 3 to the pulley 75. In this case, an unillustrated clutch mechanism which is connected to the reel spindle 2 for the film supply reel $R_1$ becomes inoperative. Therefore, the film supply reel spindle 2 is disconnected from the pulley 75. Simultaneously, electric power is supplied to an unillustrated motor circuit to start the motor 66. Thereby the pulley 75 causes the film take-up reel spindle 3 to rotate. The intermittent film feeding member 10 is driven by an unillustrated cam mechanism connected to the rotating shaft 78 of the pulleys 64 and 75 while the fly wheel 24 and, accordingly, the capstan 23 are driven by the pulley 72.

Under such a condition, the film F is pulled out from the film supply reel $R_1$ and is inserted in between the film pressing plate 9 and the aperture plate 7 provided in the image projection station 4 through the film guide roller 11 and the film damper 12. Then, the film F is intermittently moved forward along the aperture plate 7 by the intermittent film feeding member 10. When passing the image projection station 4, the film F is guided by the film guiding face 57a of the loop sensor 57 disposed immediately behind the image projection station 4 toward the film guide member 48. The film guide member 48 then guides the film F into the film path 17 for sound recording and reproduction. When the film F thus passes the magnetic heads 18 and 19, the film F is seized by the capstan 23 and the pressure roller 31 and thereby further forwarded as shown in FIG. 3.

Then, the loop sensor 57 and the projection speed control member 59 are moved by the film F against the force of the spring 62 approximately to their positions in such a manner as to form a predetermined amount of film loop between the image projection station 4 and the film path 17, i.e. to form a film loop corresponding to the film length of, for example, 18 frames between the projection aperture and the sound recording/reproducing magnetic head 18.

When the tip of the film F being moved forward by the cooperation of the capstan 23 and the pressure roller 31 comes into contact with the slanting face 38a of the film detecting member 38, then the film detecting member 38 is rotated counterclockwise around the shaft 40 by the force of the film F. Thereby the locking member 37 which is arranged into one united body with the film detecting member 38 is caused to rotate so as to release the protrudent arm 28a of the pressure pad support lever 28 from the locked engagement with the locking stepped part 37a. As a result of this, the urging force of the spring 30 causes the pad support lever 28 to rotate counterclockwise until it is stopped by the stopper pin 85. Then, the pressure pads 25 and 26 are respectively shifted to their respective active positions in which the film F is pressed against the magnetic heads 18 and 19 under the force of the springs 83 and 84. Further, in response to the displacement of the pad support lever 28, the support levers 49 and 53 are rotated respectively by the urging force of the springs 51 and 56. Accordingly, the film guide member 49 and the film guide roller 52 and thereby shifted to their respective positions as shown in FIG. 4.

On the other hand, the film F which is being moved forward by the cooperation of the capstan 23 and the pressure roller 31 comes into the lower part of the film detecting member 38 while its both side edges outside of its effective image recorded zone come into sliding contact with the arc parts 38b of the film detecting member 38. Under such a condition, the film F is further guided by the fixed film guide frame 41, film guide duct 81 and film guide roller 82 and then fed out from the film exit port 16. In the drawings, the film take-up reel $R_2$ is shown as a reel of an automatic film catching type. In this case, therefore, the film F which comes out from the exit port 16 is caught and is taken up by the film take-up reel $R_2$ which is being rotated by the reel spindle 3.

Further, under a condition where the pressure pad support lever 28 has been shifted to a position to press the pressure pads 25 and 26 against the magnetic heads 18 and 19, the locking member 37 is engaged with the tip of the protrudent arm 28a of the pressure pad support lever 28 at its shoulder part 37b adjacent to its stepped locking part 37a as shown in FIG. 4. The automatic film loading operation is completed through the process as described in the foregoing.

After completion of film loading, when the operation knob 42 is shifted to the "PROJECTION" position as shown in FIG. 4, an unillustrated lamp lighting circuit and a sound reproducing circuit are closed, while the set positions of the pressure pads 25 and 26, pressure roller 31, film guide member 48 and film guide roller 52 remain unchanged, and image projection is performed with reproduction of sound information.

During such a projection operation, if there takes place any variation in the film loop formed between the image projection station 4 and the sound recording/reproducing film path 17 (or, more precisely stated, between an image projecting aperture provided in the aperture plate 7 and the sound recording/reproducing magnetic head 18), the synchronism between the projected image and the reproduced sound begins to be disturbed by such variation in the film loop. Then, the loop sensor 57 rotates according as the film loop varies. The forked part 59a of the projection speed control member 59 which is connected to the loop sensor 57 through the spring 61 then causes the contacting points of the belt 65 on the circumferences of the cone pulley 63 and 64 to vary, in response to the sensor 57, so as to keep the film loop at a predetermined value; then the film feeding speed of the intermittent film feeding member 10 is adjusted accordingly to ensure satisfactory synchronism of the image projection and sound reproduction.

Framing adjustment of projected images is accomplished by vertically adjusting the position of the intermittent film feeding member 10 by means of an external operable member 6. Focusing is accomplished by advancing and retreating the projection lens 14 by means of an external operable knob 15.

When it is required to make a fast film forwarding operation during projection, the operation knob 42 is shifted to the "F.F." position as shown in FIG. 5. Then, the cam 44 connected to the operation knob 42 causes the change-over lever 45 to rotate clockwise. Thereby the pressure roller support frame 32 is rotated counterclockwise against the force of the spring 35 by the tip 45b of the change-over lever 45 through the pin 47, then the pressure roller 31 is shifted to its inactive position so as to release the film F from pressed contact with the capstan 23. Then, by the displacement of the support frame 32, the pressure pad support lever 28 is caused to rotate clockwise against the spring 30 through the pin 36, then the pressure pads 25 and 26 are shifted to their respective inactive positions. This releases the film F from pressed contact with the heads 18 and 19. Further, since the displacement of the support lever 28 causes the support levers 49 and 53 to rotate against the forces of the springs 51 and 56, both the film guiding member 49 and the film guide roller 52 are shifted into their active positions respectively as shown in FIG. 5.

Further, with the operation knob 42 shifted to the "F.F." position, an unillustrated change-over mechanism connected to the operation knob 42 causes the film pressing plate 9 to retreat against the force of the spring 8 forming thereby a sufficient space between it and the aperture plate 7 to allow the travelling film F to pass through there as conceptionally indicated by a broken line in FIG. 5. Meanwhile, the intermittent film feeding member 10 is also caused to retreat to prevent its feeding claws 10a from coming into contact with the film F. In this manner, the guide rollers 52 and 39 allow the film F to be quickly moved forward under a fast film forwarding operation from the supply reel $R_1$ to the take-up reel $R_2$ by the driving force of the reel spindle 3 through a travelling path which is thus formed to prevent the magnetic heads 18 and 19, the pressure pads 25 and 26 and the capstan 23 and pressure roller 31 from coming into contact with the film F. Under such a fast forwarding condition, the film F is in a strained state between the guide rollers 52 and 39. Thereby the film detecting member 38 is caused to ride on this strained part of the film F, the locking member 37 is in a state of being incapable of engaging with the protrudent arm 28a of the pressure pad support lever 28 at its stepped locking part 37a, as shown in FIG. 5, despite of the condition that the pressure pads 25 and 26 have been shifted to their respective inactive positions. Accordingly, when the operation knob 42 is again shifted from the "F.F." position to the "PROJECTION" position, the pressure pads 25 and 26, pressure roller 31, film guide member 48 and film guide roller 52 are respectively brought back into their positions as shown in FIG. 4 to permit resumption of projection.

For a film rewinding operation, the operation knob 42 is first shifted back to its "OFF" position and then shifted to the "REWIND" position. With the operation knob 42 thus set in the "REWIND" position, the unillustrated clutch changeover mechanism connected to the operation knob 42 changes the above stated clutch mechanism connected to the film supply reel spindle 2 from its inactive state to its active state and also changes another clutch mechanism connected to the film take-up reel spindle 3 from its active state to its inactive state. The reel spindle 2 is thus brought into driving connection with the pulley 75 while the reel spindle 3 is disconnected from the pulley 75. With the exception of the above mentioned change, other setting conditions remain exactly the same as the setting conditions for the fast film forwarding operation shown in FIG. 5 and the film F is rewound by the driving force of the reel spindle 2 from the take-up reel $R_2$ back to the supply reel $R_1$. When the rewinding operation is over and there remains no film in the film path 17, the film detecting member 38 comes to fall into the film guide frame 41 by its own weight. Then, the locking member 37 is shifted to a position wherein its stepped locking part 37a is brought into engagement with the protrudent 28a of the pressure pad support lever 28 under the condition as shown in FIG. 5. Therefore, after completion of film rewinding, when the operation knob 42 is shifted to its "OFF" position, the projection apparatus 1 comes to a stop in the condition as shown in FIG. 2.

Otherwise, when the operation knob 42 shifted to the "OFF" position after completion of film projection, the cam 44 causes the change-over lever 45 to rotate clockwise. The clockwise rotation of the change-over lever 45 then causes the pressure roller 31 and pressure pads 25 and 26 to shift to their inactive positions and the film guide member 48 and film guide roller 52 to shift to their active positions respectively. And then, since the film F is not in the film path 17, the clockwise rotation of the pad support lever 28 causes the tip of the protrudent arm 28a to be detached from the shoulder 37b of the locking member 37. Thereby, the film detecting member 38 slightly rotates around the shaft 40 by its own weight together with the locking member 37 until its arced part 38b comes into contact with the film guide face of the film guide frame 41. Therefore, the locking member 37 comes to engage with the tip of the protrudent arm 28a of the pad support lever 28 at its stepped locking part 37a and thereby the projection apparatus 1 comes to a stopped condition as shown in FIG. 2.

For next projection, if the film F is inserted from the image projection station 4 in a state that the operation knob 42 is shifted to the "LOAD" position, then, the film F is automatically loaded in the same manner as described in the foregoing and the next projection operation can be accomplished in the normal condition.

Further, in cases where a projecting operation is to be resumed after it has been discontinued halfway, although such discontinuation causes the locking member 37 to engage with the pressure pad support lever 28, the projecting operation can be readily resumed by shifting the operation knob 42 back to the "PROJECTION" position, because: In resuming the projection, when the pressure roller 31 presses the film F against the capstan 23 and the film take-up reel $R_2$ is driven, the film F is strained between the capstan 23 and the film guide roller 39. Then, this causes the film detecting member 38 which has been in a descended position into the film guide frame 41 to be moved counterclockwise. Accordingly, the locking member 37 is also moved to a position in which the pressure pad support lever 28 is released from engagement with the locking member 37. Therefore, the projecting operation can be resumed without any hindrance caused by the locking member 37.

FIGS. 7A-7D show an improvement of the fixed film guiding frame 41 enabling a more secure film detecting operation of the film detecting member 38, whereby on a part of the film guiding surface 41a of the film guiding frame 41 a concave part 41b into which the circular part 38b of the film detecting member 38 can enter and an inclined narrow groove 41c which is next to the concave part 41b and into which the foot of the film detecting portion having an inclined surface 38a, of the film detecting member 38 can enter are provided. Hereby, as is understood from FIG. 7B the inclined narrow groove 41c has a width which is a little larger than that of the detecting portion of the film detecting member 38 but smaller than that of the film F.

Figure 7A:
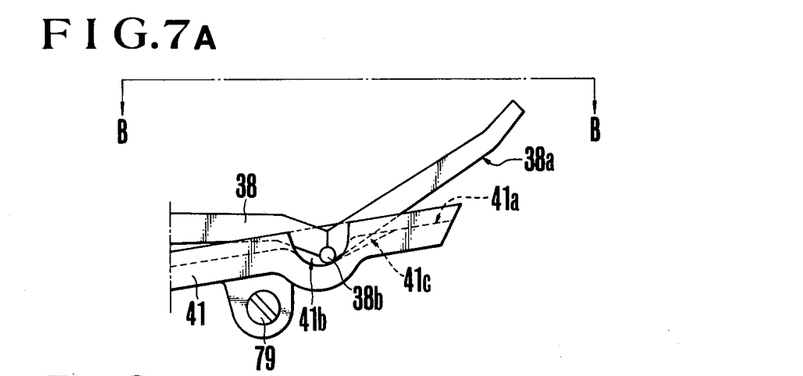
FIG. 7A shows the relation between the film detecting means and the fixed film guiding frame, before the film has been detected by the film detecting means, in side view.
Figures 7B, 7C, 7D:
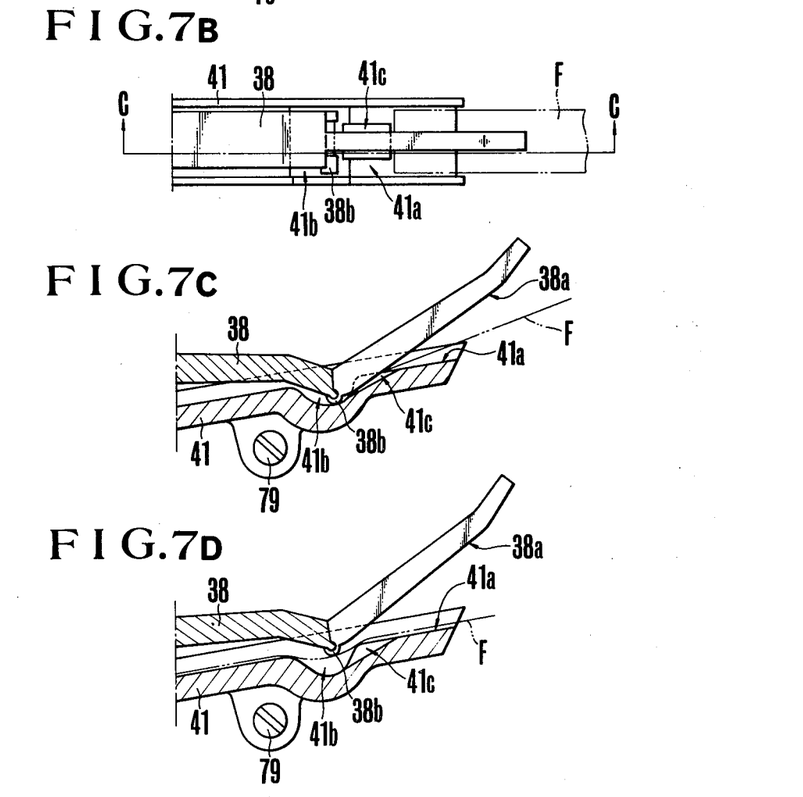
FIG. 7B is a view taken along line B—B, of FIG. 7A.
FIG. 7C is a sectional view taken along the line C—C, of FIG. 7C.
FIG. 7D is a view similar to that of FIG. 7C showing the relation between the film detecting means and the film guiding frame while the film is in the film guiding frame.

In case of the above composition and in the state in which the film F exists in the film guiding member 41 the circular part 38b of the film detecting member 38 is in the concave part 41b of the film guiding frame while the foot of the film detecting portion is in the inclined narrow groove 41c as is understood from FIG. 7A and FIG. 7C.

When the film F is fed by the cooperation of the capstan 23 and the pressure roller 31 after the film loading in the above mentioned state, the front end of the film F touches the top portion of the wedge-shaped part formed with the inclined surface 38a of the film detecting member 38 and the guiding surface 41a of the film guiding frame 41 as is shown in a broken line in FIG. 7B and FIG. 7C, whereby the film F cannot enter into the inclined narrow groove 41c and therefore advances pushing up the film detecting member 38 against its own weight while being fed by the capstan 23 and the pressure roller 31.

Thus, in the same way as is explained in accordance with FIG. 3, the film detecting member 38 rotates around the shaft 40 together with the locking member 37 along the counterclockwise direction so as to release the locking of the pressure pad support lever 28.

As shown in FIG. 7D the film F is further fed under the circular part 38b of the detecting member 38 so that as long as there exists the film F in the guiding frame 41 the circular part 38b is prevented from entering into the concave part 41 b, whereby so long as there exists the film F in the guiding frame 41 the locking of the support lever 28 by the locking member 37 is not effected at all even if the operation knob 42 is changed over into the "OFF" position, while the locking of the support lever 28 by the locking member 37 is effected when the operation knob 42 is changed over into the "OFF" position only after there exists no film F in the film guiding frame 41 any more and thus the circular part 38b of the film detecting member 38 is in a position to enter into the concave part 41b of the guiding frame 41.

As explained above in accordance with the composition shown in FIGS. 7A-7D the film detecting operation of the film detecting member 38 can be carried out more securely as compared with the aforementioned embodiment. Further, even if the operation knob 42 is changed over into the "OFF" position during the motion picture projection, the locking of the pad support lever 28 by the locking member 37 is not effected at all, whereby the motion picture projection can be started immediately by changing the operation knob 42 over into the "PROJECTION" position again.

As described in detail above, in accordance with this invention, the pressure pad means which serves to press the film against the magnetic head means for sound recording and/or reproduction in the sound motion picture projection apparatus is retained in its inactive position, namely a position sufficiently separated from the magnetic head means by the locking means; while, behind the magnetic head means and the pressure pad means, there is provided the film detecting means which releases the locking of the pressure pad means by the locking means, by detecting the tip of the film, when it has passed through the magnetic head means and the pressure pad means. This thus allows the pressure pad means to come into its active position to press the film against the magnetic head means. Therefore, the film can be automatically loaded always in a correct manner. Then, unlike the conventional sound motion picture projection apparatuses, the operator of the apparatus is not required to check for correct film loading before commencement of every projection operation. Furthermore, even when the operator makes an erroneous operation such as switching the projection apparatus under an incomplete film loaded condition to a projecting mode, or film loading under the projecting mode, the film can be automatically loaded always in a correct manner irrespective of such erroneous operations. This is a great advantage of the invention.

Further, with the capstan for continuous film driving and the pressure roller provided between the magnetic head means and the film detecting means, the pressure roller means is arranged to be shiftable by an external operable means between its active position in which it presses the film against the capstan and its inactive position in which the pressure roller means is detached from the capstan and is kept sufficiently away therefrom; while the pressure pad means is arranged to be in an operative relation to the pressure roller means; and the film detecting means are arranged to be capable of detecting the film being moved forward by the cooperation of the capstan and the pressure roller means. With such arrangement, the apparatus can be loaded with the film by feeding the film by the cooperation of the capstan and the pressure roller means. Further, when the pressure roller means is shifted to its inactive position, this shifting causes the pressure pad means to concurrently shift also to an inactive position. This arrangement, therefore, dispenses with other types of film advancing means such as a sprocket, etc. that are employed in the conventional sound motion picture projection apparatuses; and yet film loading can be accomplished more correctly than the conventional apparatuses. Thus, in accordance with this invention, a sound motion picture projection apparatus of the automatic film loading type can be improved to a great extent.

In addition to the foregoing, the invented arrangement further includes the provision of film guiding means disposed in front of the magnetic head means and the pressure pad means for the purpose of guiding the film toward the magnetic head means and the pressure pad means. The film guiding means is arranged to be shiftable between its active position in which it guides the film and its inactive position in which it releases the guiding of the film and is also arranged to be in an operative relation to the pressure pad means in such a manner that the film guiding means is shifted to its inactive position when the pressure pad means is shifted to its active position and to the active position when the latter is shifted to its inactive position. This ensures that film loading can be accomplished more readily and more accurately.

The invented arrangement also includes the provision of the loop sensing means which is capable of sensing variation in the amount of the film loop formed between the image projection station of the projection apparatus and the above mentioned magnetic head means. The loop sensing means is provided with a film guiding surface which cooperates with the above stated film guiding means when the latter is in its active position in guiding the film coming from the image projection part toward the magnetic head means and the pressure pad means. This not only prevents the provision of the loop sensing means from becoming an impediment in film loading but also greatly facilitates film loading operations.

What is claimed is:

1. A sound motion picture projection apparatus comprising:
    (a) magnetic sound recording and reproducing means disposed along a sound recording and reproduction film path;
    (b) pressure means for pressing a film against said magnetic means for sound recording and/or reproduction, said pressure means being shiftable between a first position to press the film against the magnetic means and a second position to release the pressing of the film against the magnetic means;
    (c) urging means for urging said pressure means toward said first position thereof;
    (d) continuous film advancing means disposed along said sound film path for continuously advancing the film after passing said magnetic means;
    (e) manually operable means for shifting said pressure means from said first position to said second position;
    (f) locking means for retaining said pressure means in said second position against the urging force of said urging means; and
    (g) film detecting means for detecting the film advanced by said continuous film advancing means, said detecting means being operatively connected to said locking means and arranged to release the locking of said pressure means in said second position by means of said locking means upon detection of the oncoming film advanced by said film advancing means.

2. A sound motion picture projection apparatus according to claim 1, wherein said film detecting means is disposed in said sound film path behind said continuous film advancing means and shiftable in response to the film advanced by said film advancing means; and said locking means is fixedly connected to said film detecting means and releases the locking of said pressure means in said second position when said film detecting means shifts in response to the oncoming film advanced by said film advancing means.

3. A sound motion picture projection apparatus according to claim 1, wherein said continuous film advancing means includes:
    a driving member disposed at a fixed position along said sound film path and operatively connected with a driving motor; and
    a pressure roller member for pressing the film against said driving member for continuously advancing the film, said roller member being operatively associated with said manually operable means and changeable between a first position and press the film against the driving member and a second position to release the pressing of the film against the driving member through the operation of said manually operable means;
    and wherein said pressure means is operatively associated with said pressure roller member in such a manner that the pressure means is shifted from its first position to its second position when the pressure roller member is shifted by said manually operable means from its first position to its second position; and, when said pressure roller member is shifted from its first to position to its second position, said locking means cuts off the operative association of said roller member with said pressure means and retains the pressure means in its second position.

4. A sound motion picture projection apparatus according to claim 1, further comprising:
    intermittent film advancing means for intermittently advancing the film at a picture projection station for picture projection; and
    film guide means for guiding the film advanced by said intermittent film advancing means toward said sound film path, said film guide means being shiftable between a first position to guide the film toward the sound film path and a second position to release the guiding of the film and operatively associated with said pressure pad means in such a manner that the film guide means is kept in the first position when the pressure pad means is in its second position and shifted to the second position when the pressure pad means is shifted to its first position.

5. A sound motion picture projection apparatus according to claim 4, further comprising:
    loop detecting means for detecting the change in the amount of a film loop formed between said picture projection station and said sound film path, said loop detecting means being provided with a film guiding surface for guiding the film from said intermittent film advancing means to said film guide means.

6. A sound motion picture projection apparatus comprising:
    (a) a magnetic head means for recording sound signals on a film or for reproducing sound signals recorded thereon, said head means being fixedly disposed at a position along a sound recording and/or reproduction film path;
    (b) pressure pad means for pressing the film against said magnetic head means for sound recording and/or reproduction;
    (c) first supporting meanns for supporting said pressure pad means, said first support means being shiftable between a first position in which the pressure pad means passes the film against the magnetic head means and a second position in which the pressure pad means releases the pressing of the film against the magnetic head means;

(d) urging means for urging said first supporting means toward its first position;

(e) film driving means disposed at a first position along said sound film path for continuously advancing the film after it passes said magnetic head means;

(f) pressure roller means for pressing the film against said film driving means for continuously advancing the film;

(g) second supporting means for rotatably supporting said pressure roller means, said second supporting means being shiftable between a first position in which the pressure roller means presses the film against the film driving means and a second position in which the pressure roller means releases the pressing of the film against the film driving means;

(h) manually operable means for shifting said second supporting means between its first and second positions;

(i) connecting means for operatively associating said first supporting means with said second supporting means, said first supporting means being shifted from its first position to its second position against the urging force of said urging means through said connecting means when said second supporting means is shifted by said manually operable means from its first position to its second position;

(j) locking means for retaining said first supporting means in its second position against the urging force of said urging means when the first supporting means is shifted to the second position; and (k) film detecting means for detecting the film advanced by the cooperation of said film driving means and said pressure roller means in a state where said second supporting means is shifted to its first position, said film detecting means being operatively connected to said locking means in such a manner that the film detecting means releases the locking of said first supporting means in its second position by means of said locking means when it detects the film advanced by the cooperation of said film driving means and said pressure roller means; and said first supporting means is automatically shifted to its first position by the urging force of said urging means when the locking by said locking means is released.

7. A sound motion picture projection apparatus according to claim 6, wherein said film detecting means is disposed behind said film driving means in said sound film path and is shiftable in response to the film advanced by the cooperation of the film driving means and the pressure roller means; and said locking means is fixedly connected to said film detecting means and releases the locking of said first supporting means when the film detecting means shifts in response to the film advanced by the cooperation of said film driving means and said pressure roller means.

8. A sound motion picture projection apparatus according to claim 6, further comprising:

intermittent film advancing means for intermittently advancing the film at a picture projection station for picture projection; and film guide means for guiding the film advanced by said intermittent film advancing means toward said sound film path, said film guide means being shiftable between a first position to guide the film toward the sound film path and a second position to release the guiding of the film and operatively associated with said first supporting means is such a manner that the film guide means is kept in its first position when the first supporting means is in its second position and is shifted to the second position when the first supporting means is shifted to its first position.

9. A sound motion picture projection apparatus according to claim 8, further comprising:

loop detecting means for detecting the change in the amount of a film loop formed between said picture projection station and said sound film path, said loop detecting means being provided with a film guiding surface for guiding the film from said intermittent film advancing means to said film guide means; and said film guide means being arranged to further guide the film coming through said loop detecting means toward said sound film path in its first position.

* * * * *